Patented Apr. 8, 1924.

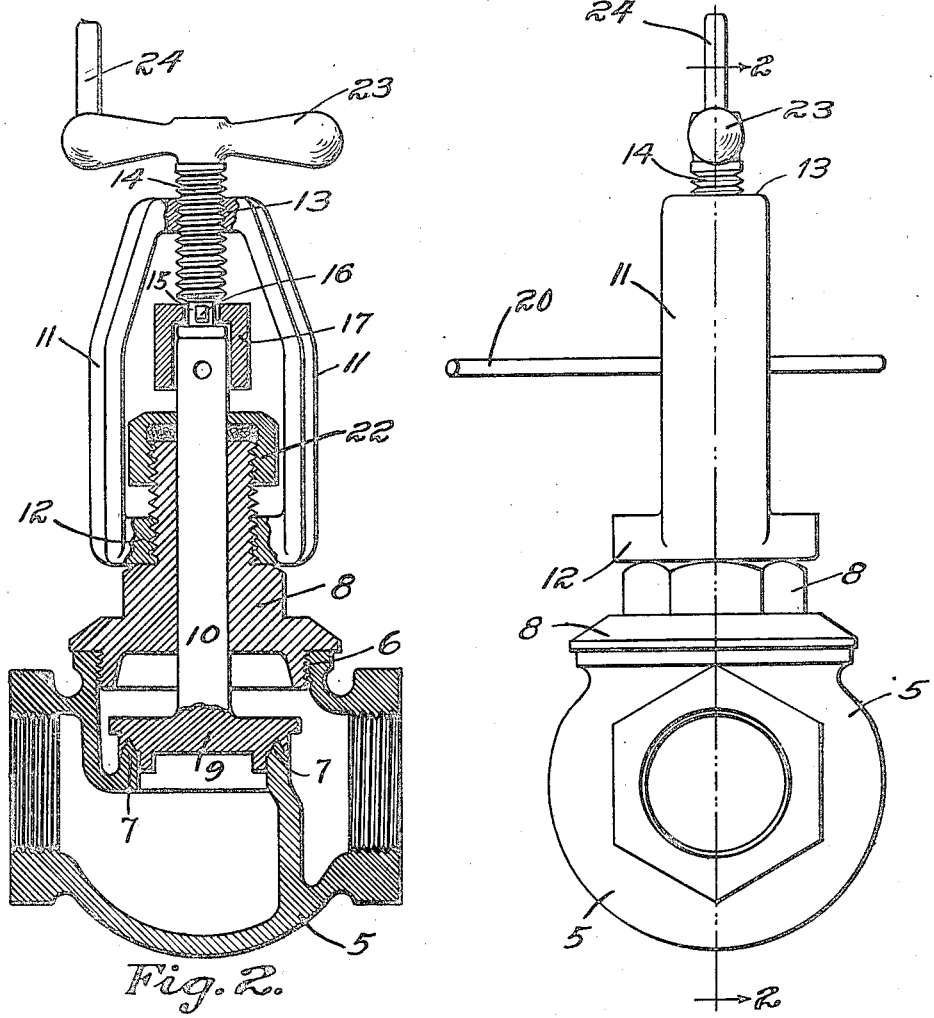

1,489,990

UNITED STATES PATENT OFFICE.

ARTHUR JAMES DONOHOE AND FRANK BUTLER, OF MORRISTOWN, TENNESSEE.

VALVE.

Application filed May 24, 1919. Serial No. 299,448.

*To all whom it may concern:*

Be it known that we, ARTHUR JAMES DONOHOE and FRANK BUTLER, citizens of the United States, residing at Morristown, in the county of Hamblen, State of Tennessee, have invented a new and useful Valve, of which the following is a specification.

The present invention relates to globe valves, the principal object being to provide a globe valve which is of a construction to obviate the stripping of the valve stem as is ordinarily experienced with valves of this type.

A further object of the invention is to provide a valve wherein the parts may be replaced should one or more become worn, thus making it unnecessary to employ an entirely new valve should one of the original parts become worn.

Still another object of the invention is to provide a valve wherein the valve stem consists of a number of sections so arranged as to allow the section carrying the valve being rotated independently of the operating section to perform the function of reseating the valve on its seat, and at the same time preventing injury to the threads during this operation.

Still another object of the invention is to provide a valve of the reciprocable type which employs a permanent threaded stem, of a valve and valve stem carried thereby which is detachably engaged with the threaded stem, thus rendering the valve being readily removed from its seat and a new one substituted therefor, it being unnecessary to employ the usual interiorly threaded sleeve for the reception of the valve.

Still another object is to provide a valve of this type having the above characteristics, which is simple in construction, which consists of few parts and which may be manufactured and placed on the market at a minimum cost.

With the above and other objects and advantages in mind, the invention consists of combinations of elements, constructions and arrangements, operations and general assemblage the details of which will be hereinafter fully set forth and recited in the subjoined claim, one embodiment of the invention being illustrated in the accompanying drawing wherein:—

Figure 1 is a side elevation of a valve constructed in accordance with our invention;

Figure 2 is a vertical longitudinal sectional view of the same;

Figure 3 is a top view of the connection between the valve stem and handle shank of our improved valve;

Figure 4 is a side view of the same positioned on the valve stem and disconnected from the handle shank; and, Figure 5 is a side elevation of the connection detached.

Referring to the drawings, wherein like characters of reference designate like parts on all of the views, the numeral 5 designates a valve casing or globe having threaded nipples projecting from the ends thereof, one of which is an inlet port and the other an outlet port. The upper side of the globe is open and provided with interior screw threads 6.

Disposed centrally within the globe 5 is a valve seat 7 the edges of which are beveled upon opposite sides thereof toward the upper edge of the valve seat to afford a water tight joint between the valve and valve seat. A removable hood 8 is threaded in the open side of the globe and is formed with an exteriorly threaded nipple or extension.

A reciprocable valve is employed which includes a valve disk 9 and a stem 10 projecting therefrom, the stem 10 being disposed in the hood 8 and projecting above the upper end thereof. One face of the valve disk 9 is provided with an annular groove the walls of which are inclined towards each other so as to snugly receive the beveled edges of the valve seat 7.

An adjustable inverted U-shaped yoke is provided and is designated by 11, the lower ends of this yoke being integrally formed with an interiorly threaded collar 12 which is threaded upon the hood 8. The crest of the U-shaped yoke is formed with a threaded opening 13 in which a relatively short threaded stem or shank 14 is mounted. The inner end of this stem 14 is formed with a head 14' provided with a reduced neck 15, connecting the threaded stem 14 and head 14'.

In order to connect the stem 10 with the stem 14 a sleeve 17 is provided which is formed with an elongated opening 18 in one side thereof and which communicates with an opening 19 in one end of the sleeve the opening 19 being of less width than the opening 18 and as shown, the opening 19 extends transversely across this end of the sleeve and is reduced in width at that end diametrically opposite to the opening 18 so that the stem 14 may be moved to cause the lug 16 to engage within the contracted portion of the opening 19 to permit of grinding the valve by means of the handle 24, should it be impossible to operate the rod 20. In connecting the two stems the sleeve is engaged on the upper end of the valve stem 10 and the head 14' is moved through the slot 18, the neck 16 being accommodated in the slot 19. Extending laterally from the reduced neck 15 is a lug 16 which normally lies between the walls of the slot 19.

A nut 22 is threaded upon the hood 8 and is designed to hold a suitable packing 22' to insure a fluid-tight connection between the valve stem 10 and hood 8. A handle 23 is fixed to the upper end of the stem 14 and to which is secured a vertical operating bar 24. The sleeve 17 is provided with openings 31 adapted to register with the opening 32 of the stem 10 for the purpose of accommodating the rod 20 when it is desired to oscillate the valve to grind the same.

When it is desired to reseat the valve on its seat the stem 14 is operated to force the valve to its seat. The rod 20 is then inserted transversely through the stem 10 and sleeve 17 and the rod oscillated, the lug 16 moving between the walls of the slot 19 during the reseating operation.

It might be further stated that the valve operates in one direction against the pressure of the steam passing through the valve body and operates under the movement of the threaded stem 14 when the same is moved in said direction to be seated.

Having thus described our invention what we claim as new and desire Letters Patent on, is:—

A valve comprising a casing, a valve seat in the casing, a removable hood secured to the casing and disposed directly over the valve seat, said hood having an extension, a yoke having a threaded lower portion threaded on the extension of the hood, said yoke having a threaded opening formed at the upper end thereof, a valve stem movable through the hood and having a transverse opening at its upper end, a threaded shank extending through the threaded opening at the upper end of the yoke, said shank having a lug at the lower end thereof, a sleeve positioned over the valve stem and having a cut out portion to receive the lug and having openings adapted to register with the opening of the valve stem, a rod adapted to be passed through the registering openings to lock the sleeve to the valve stem, the lower end of the threaded shank adapted to contact with the upper end of the valve stem to exert a pressure thereon, a handle on the threaded shank and means extending upwardly from the handle to be gripped to rotate the shank.

In testimony that we claim the foregoing as our own, we have hereto affixed our signatures in the presence of two witnesses.

ARTHUR JAMES DONOHOE.
FRANK BUTLER.

Witnesses:
E. B. FISHER,
E. T. BETTIS.